United States Patent [19]

Miller

[11] Patent Number: 4,848,877
[45] Date of Patent: Jul. 18, 1989

[54] LIQUID CRYSTAL DEVICES AND SYSTEMS USING SUCH DEVICES

[75] Inventor: Peter J. Miller, Cambridge, Mass.

[73] Assignee: Cambridge Research and Instrumentation, Inc., Cambridge, Mass.

[21] Appl. No.: 102,407

[22] Filed: Sep. 29, 1987

[51] Int. Cl.[4] ................................................ G02F 1/13
[52] U.S. Cl. ................................. 350/347 E; 350/335; 350/346
[58] Field of Search ..................... 350/347 F, 332, 346, 350/335

[56] References Cited

U.S. PATENT DOCUMENTS

| | | | |
|---|---|---|---|
| 4,197,008 | 4/1980 | Pinnow et al. | 350/335 |
| 4,385,806 | 5/1983 | Fergason | 350/347 R |
| 4,394,069 | 7/1983 | Kaye | 350/347 E |
| 4,417,785 | 1/1983 | Nakamura | 350/346 |
| 4,536,760 | 8/1985 | Navarro et al. | 340/798 |
| 4,639,091 | 1/1987 | Huignard et al. | 350/347 V |
| 4,674,841 | 6/1987 | Buzak | 350/347 G |
| 4,684,220 | 8/1987 | Shionozaki et al. | 350/350 S |
| 4,690,508 | 9/1987 | Jacob | 350/331 R |
| 4,726,663 | 2/1988 | Buzak | 350/347 |
| 4,729,640 | 3/1988 | Sakata | 350/347 G |

FOREIGN PATENT DOCUMENTS 0201938 11/1986 European Pat. Off. ............ 350/332

OTHER PUBLICATIONS

A. M. Title, "Improvement in Birefringent Filters", Applied Optics, vol. 15, No. 11, Nov. 1976.
I. Soc, "Birefringent Chair Filters", Journal of the Optical Society of America, vol. 55, No. 6, Jun. 1965.
J. L. Fergason "Performance of a Matrix Display Using Surface Niode", 1980 Biermal Display Research Conference (IEEE), pp. 177-179, Oct. 1980.

Primary Examiner—John S. Heyman
Assistant Examiner—Huy K. Mai
Attorney, Agent, or Firm—Robert F. O'Connell

[57] ABSTRACT

A liquid crystal device which uses parallel transparent plates having a nematic crystal material which is free of chiral or twisting additives positioned therebetween. The device applies an AC carrier modulated signal to establish an electric field across the material, the modulation level thereof controlling the state of the directors thereof over a range from a selected partially driven state to a fully driving state. The device can be used in a system to measure and to control the retardance of the device and in systems for controlling the intensity of light being transmitted through the device. The devices can further be used in a system to provide a birefringent filter.

12 Claims, 4 Drawing Sheets

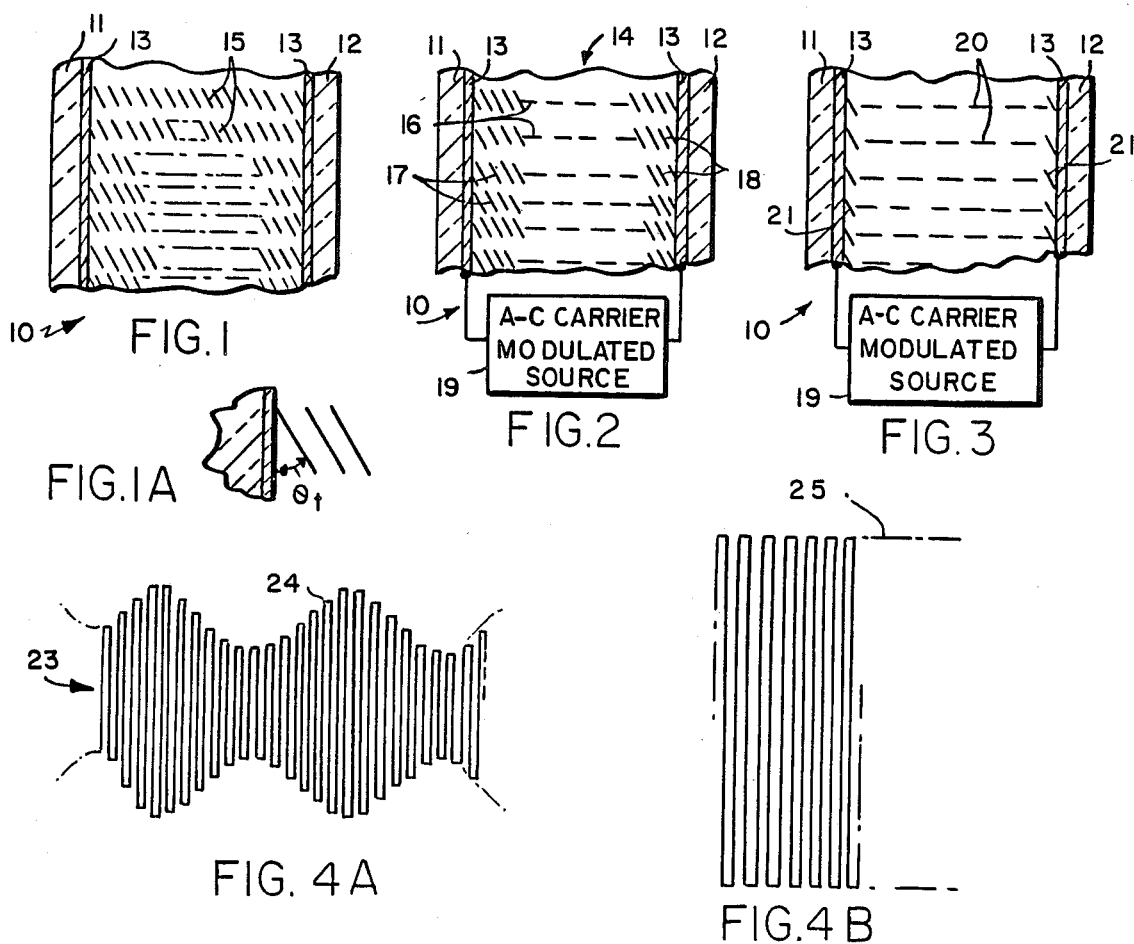
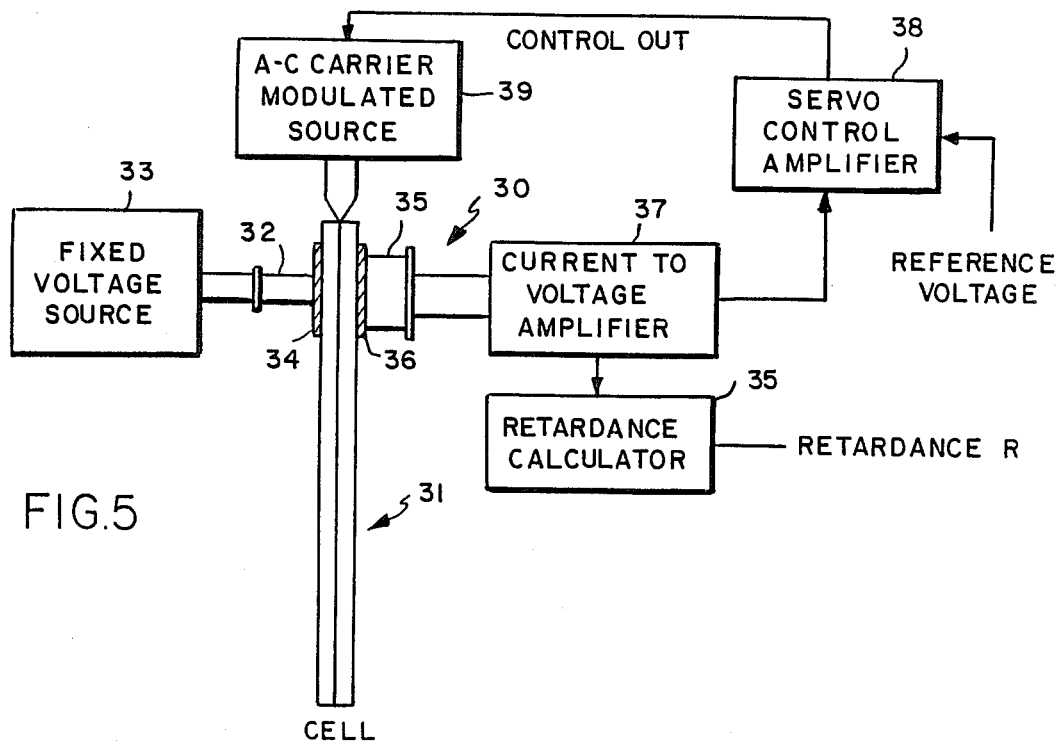

LIQUID CRYSTAL DEVICES AND SYSTEMS USING SUCH DEVICES

INTRODUCTION

This invention relates generally to liquid crystal devices and systems using such devices and, more particularly, to a unique liquid crystal cell structure using nematic phase materials which are free of chiral or twisting additives and to unique systems using liquid crystal cell structures which can include therein means for sensing light retardance characteristics of such cells for controlling the intensity and/or the stability of light sources which provide light signals having wavelengths within a selected range.

BACKGROUND OF THE INVENTION

One class of liquid crystal devices, or cells, uses nematic phase liquid crystal materials having chiral or twisting additives (often referred to as "twisted nematic phase" materials) wherein the rod-like liquid crystal molecules, often referred to in the art as "directors", lie in different directions from one surface of the cell to the other. Such twisted material cell structures are often used in display systems, e.g., watch displays, calculator displays, and the like.

Another class of liquid crystal cells uses nematic phase materials which are free of chiral or twisting additives, which cells, while less widely used for display devices, can be useful if properly designed in systems which require control or stabilization of light sources, particularly modulation of monochromatic light sources, such as lasers, and in systems which are used to produce light retardance for use in, e.g., birefringent filters. In such cells, a liquid crystal material with dielectric and optical anisotropies is placed between parallel transparent plates having transparent electrodes. When no electrical voltage is placed across the electrodes of the plates the directors lie at some angle $\Theta_t$ to the plates substantially along the direction of microscratches or other alignment pattern which has been created on the surface of the plates. The pattern of scratches or an alignment grid pattern is generally termed the "alignment layer" of the cell. The alignment layer is highly anisotropic, having a preferred axis along the direction of the alignment pattern, such axis normally being referred to as the alignment layer axis. The angle $\Theta_t$ is generally called the "tilt" angle and is a function of the particular surface treatment used to form the alignment pattern.

The optical path length is different for light with a polarization axis parallel to the long axis of the directors than for light with a polarization axis orthogonal to such long axis. Because the liquid crystal molecules tend to align themselves along the alignment layer axis, the macroscopic optical index of refraction is different for light polarized parallel to the alignment layer axis than for light polarized orthogonally to it. Such a cell has a retardance equal to the optical index anisotropy multiplied by the cell thickness. When an electric field E is imposed thereon, by applying a suitable voltage across the transparent electrodes, the liquid crystal directors tend to align themselves in the direction of the electric field, which direction is normal to that of the alignment pattern. When the intensity of the electric field is sufficiently strong so that substantially all of the directors are so aligned, normally termed a "fully driven" state, there is essentially no optical path difference for the two polarization components and the retardance is substantially zero.

This variation of optical retardance between a non-driven and a fully driven state forms the basis for a number of light modulators. First, the cells can produce an electrically-variable optical path length for light polarized parallel to the alignment pattern. This operation is useful in a variety of systems including etalons. Second, for light polarized 45 degrees to the alignment pattern, the cells can perform a polarization rotation by acting as a variable waveplate.

Although the above-discussion considers only two operating states (fully driven and non-driven, i.e., fully relaxed) there is a continuous range of states between the fully driven and the fully relaxed states. In these intermediate states, or "partially driven" states, some of the liquid crystal directors lie against, or relatively near, each alignment layer (and are "relaxed") and some of the directors in the middle region of the cell are normally aligned (are "driven"). These intermediate retardance states are achieved by applying an electric field which is less intense than that required to achieve the fully driven state.

In general, the voltage required to produce a given retardance is dependent upon the cell dimensions, temperature, and the properties of the liquid crystal material. Further, the form of the dependence between the applied electric field strength and optical retardance is not linear and not easily predicted. Due to these considerations, as well as to inevitable variations which occur in the manufacturing process and in the materials themselves, devices which will exhibit a known optical retardance for a given applied electric field strength are difficult to produce without the costly and time-consuming task of "tuning" each cell individually to obtain a particular cell having the desired characteristics.

Further, the switching speeds of such cells which have been proposed are relatively slow. If the cells are constructed so that the alignment layer axes of the opposing plates are antiparallel, the cell relaxes to a stable state but exhibits slow response time (e.g., about 10–50 ms.) due to hydrodynamic effects. In order to achieve faster switching speeds the prior art has suggested some modifications to the structure of such cells. U.S. Pat. No. 4,582,396, issued on Apr. 15, 1986 to Bos et al., describes a device with a relatively fast switching response. The device is constructed by placing the opposing alignment grids parallel to one another. Such construction permits faster switching times (e.g., about 1–2 ms.) by removing the hydrodynamic vorticity which is normally present in cells having antiparallel alignment grids. However, such a cell is only metastable in the relaxed state and it will decay after about 10–100 ms. with unpredictable performance thereafter. Accordingly, the usefulness of such a cell is limited only to systems where it will be energized to the driven state every 10 ms. or more often.

U.S. Pat. No. 4,385,806, issued on May 31, 1983 to Ferguson, describes the manufacture of relatively thick cells having an unspecified alignment orientation. The patent discloses cells of 50 to 75 micron thickness, for example, which cells are driven with a relatively large DC bias voltage so as to place most, but not all, of the liquid crystal directors into the driven state. The response then to a relatively small AC signal superimposed upon the DC bias is very rapid. Such fast response is explained as due to the modulation of the orientation angle of those directors present at the interface between the substantially driven and the substantially relaxed directors. However, such a cell demonstrates several shortcomings.

First, because the cell is so thick, it produces substantial retardance during operation and, thus, it must be used with compensating retarders in order to operate near zero retardance, an operating point frequently sought.

Second, a liquid crystal cell which uses a large DC bias exhibits migration of ionic species in the crystal material. Various ionic species are always present in the material, arising from impurities in the liquid crystal medium as well as from impurities which leach into the cell during manufacture or use. Such ions migrate to the electrode having a polarity opposite to that of their ionic charge. Once such migration occurs, the net electric field is equal to the field imposed by the electrodes, plus the field due to the migrated ionic species. Since the distribution of ionic species across the cell surface is non-uniform, the resultant electric field is also non-uniform. Such field non-uniformity produces spatial non-uniformities in the cell retardance, rendering it of low optical quality.

Finally, the use of a large DC bias field placed across the liquid crystal cell electrolyses the liquid crystal molecules, greatly shortening the useful life of the cell.

BRIEF SUMMARY OF THE INVENTION

Liquid crystal cells in accordance with the invention permit predictable operation over a range of retardance between a fully driven and a fully relaxed state, such retardance being rapidly adjustable using a suitable driving circuit therefor. Such cells can operate near zero retardance, while suffering no spatial non-uniformities, and can remain in their non-driven state for extended periods of time. Moreover, they need not operate with a DC bias and, accordingly, avoid the ion migration and electrolysis problems which arise when using such a DC bias voltage.

In accordance with the invention, the liquid crystal cells have two surface alignment layers, the alignment layer axes of which are anti-parallel in orientation and which provide liquid crystal molecules at a moderate tile angle (e.g., a few degrees), so that the device is stable when undriven. Such a cell has a slow response time (e.g., about 50 ms.) if it is allowed to relax completely. However, it has a very rapid response when it is driven between differing, but substantially driven, states in which the driven signal is an amplitude modulated, A-C carrier signal in which the carrier is modulated between selected AC modulation levels so as to drive the cells between such levels.

In such case directors in the regions near the alignment layers tend to lay down in crystal configuration while the directors in the central region therebetween tend to be aligned with the electric field lines of an imposed electric field. As long as the thickness of the central region is substantially greater than the thickness of each of the regions near the alignment layers and as long as the cell is operated with a sufficiently large electric field strength, the detrimental hydrodynamic effects of prior art devices are effectively eliminated and the cell responds rapidly (e.g., about 1-2 ms.) to changing A-C modulated driving signals.

The driving circuit is designed to provide rapid switching of the applied electric field, e.g., at a frequency between a few Hz and a few hundred Hz, so that ionic impurities have no time to migrate during a single cycle and spatial non-uniformities are avoided.

In addition, the cell structure is designed to permit a retardance sensing system to be included in the cell construction itself so that the cell can be used in systems in which the retardance of the cell is to be controlled with a reasonable degree of precision. Thus, the cell can be used in a tunable waveplate structure, in a system for controlling the intensity of, and/or for stabilizing the operation of, a source of light, preferably a source in which the light at any one time has wavelengths within a selected range, or is monochromatic, such as a laser light source. Such a cell, or cells, may also be used with white light sources as the precisely tunable, or controllable, birefringent element, or elements, in tunable birefringent filters. Accordingly, the wavelength of operation can be adjusted by tuning the retardance of the liquid crystal cell, or cells.

DESCRIPTION OF THE INVENTION

The invention can be described in more detail with the help of the accompanying drawings wherein:

FIGS. 1, 2 and 3 show diagrammatic views of a liquid crystal cell in accordance with the invention in three different operating states;

FIG. 1A shows an enlarged view of a portion of the cell of FIG. 1;

FIGS. 4A and 4B show waveforms of the electrical signal applied to the cell of the above figures for two different operating states;

FIG. 5 shows a block diagram of one embodiment of a system in accordance with the invention;

Figure 6A:
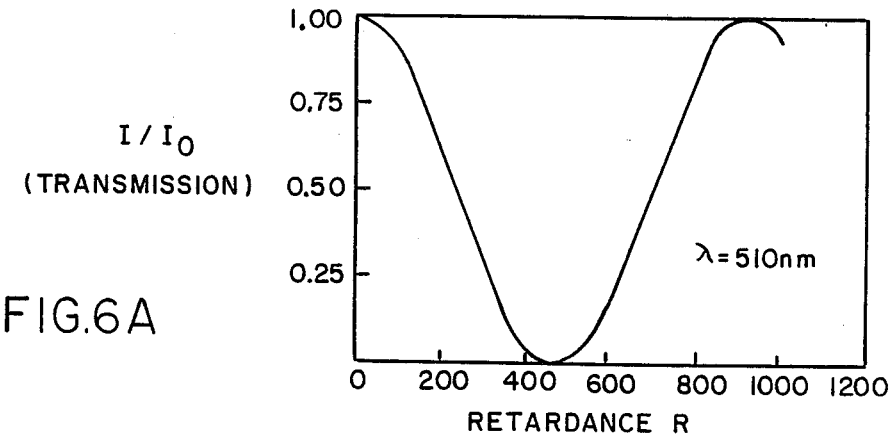
FIGS. 6A and 6B show waveforms of light transmission as a function of retardance at two different wavelengths.

As can be seen in FIG. 1, in which the relative dimensions are exaggerated for clarity of explanation, a cell device 10 in accordance with the invention comprises a pair of transparent plates 11 and 12, which in a particular embodiment may be glass. One material often used therefor is a glass material sold under the designation 7059 by Corning Glass Works of Corning, N.Y. and is used for wavelengths shorter than about 2.0 microns. For longer wavelengths, e.g., up to 10 microns or so, other substrates, such as zinc-selenium (ZnSe) or potassium bromide (KBr) materials may be used.

A transparent electrically conductive electrode 13 is applied to the inner surfaces of plates 11 and 12. A liquid crystal material 14, such as a nematic liquid crystal mixture which is free of chiral or twisting additives, readily available from many sources, is placed between the plate/electrode elements, the liquid crystal directors 15 thereof all being substantially aligned so as to have a moderate tilt angle $\Theta_t$ e.g., a few degrees), as shown in FIG. 1A, when in a completely relaxed state, i.e., one in which no electric field is applied across the electrode 13.

If a moderate A-C modulated electric field is applied across the electrodes from an A-C carrier modulated signal source 19, as shown in FIG. 2, the directors 16 in the central region thereof are aligned with the electric field while those directors 17 and 18 at the regions near the plate/electrode elements are not (a "partially" driven state). If the A-C modulated electric field is increased to a level such that the liquid crystal material is effectively in a "fully" driven state, such as shown in FIG. 3, substantially all of the directors 20 are aligned with the electric field, except for one or two, or at most a very few molecular layers of directors 21 at or very near the electrodes 13.

In order to achieve such operation the thickness of the cell structure is determined in a manner different from that used to calculate the thickness of cell structures of the prior art. It is helpful in understanding the invention to discuss the differences in such calculations.

Conventional cells are designed to produce some retardance $R_{rel}$ in the "off" (or "relaxed") state, and are completely undriven in that state. The cell thickness is chosen according to the equation:

$$T_{con} = R_{rel}/(n_e - n_o)$$

where $R_{rel}$ is the retardance of the cell in a fully relaxed or undriven state, $n_o$ is the ordinary index of refraction of the cell in a direction perpendicular to the long axis of the liquid crystal directors and $n_e$ is the extraordinary index of refraction of the cell along the long axis.

In addition, as has been known to the art, a correction factor slightly greater than unity is needed to derive the thickness of cells with alignment layer treatments producing a tilt angle $\Theta_t$ in excess of a few degrees.

In calculating the thickness of cells in accordance with the invention, such cells are designed to produce a continuous range of retardances and are always operated with a central region 16 of field-aligned directors. This central region acts as a hydrodynamic buffer region to prevent the relaxed directors on opposite sides of the cell from interacting. The buffer thickness $T_{buffer}$ is derived from hydrodynamic considerations, but as a practical guide it should have a thickness such that $$T_{buffer} = T_{max} - T_{min},$$

where $T_{max}$ is the total thickness of both relaxed director regions when the cell is in its partially driven state (see FIG. 2) and $T_{min}$ is the total thickness of both relaxed director regions when the cell is in its most fully driven state (see FIG. 3).

$T_{min}$ is effectively zero, so that $T_{buffer} = T_{max}$, so that the overall thickness of the cell, $T_{cell} = 2T_{max}$, where $T_{max}$ can be calculated in the same manner as $T_{con}$, i.e., $T_{max} = R_{max}/(n_e - n_o)$, where $R_{max}$ is the maximum retardance in the above discussed range of retardance produced during such operation. Such range may extend from a fully driven state (where R is essentially zero) to a selected partially, or intermediate, driven (not fully relaxed) state (where R is equal to $R_{max}$). $T_{max}$ and $T_{min}$ may be calculated using the equation above for conventional cells, given the requirements for the range of retardances the cell must produce in operation. Overall thickness of the cell is given by $$T_{cell} = T_{max} + T_{buffer}$$

or $$T_{cell} = 2 \cdot T_{max}.$$

As mentioned above, the driver circuit of a system in accordance with the invention is a conventional A-C, carrier modulated source 19 which is arranged, for example, to have a square-wave carrier 23 suitably modulated between a first value to produce a partially driven state as shown by exemplary sine wave 24 in FIG. 4(a) to a second essentially constant value to produce a fully driven state, as shown by a constant modulation signal 25 in FIG. 4(b). In a typical embodiment the A-C carrier may be at a frequency of about 2 kHz., while the modulation signal for a partially driven state may be at a frequency within a range from a D-C voltage to about 1000 Hz. In some cases it may be desirable to use other values depending on the application in which the cell is to be used, even utilizing modulation frequencies which are higher than, i.e., either approximating or exceeding, the carrier frequency.

Because the polarity of the electrodes is switched very rapidly by the A-C modulated signal the ionic impurities within the cell do not have time to migrate appreciably during a single phase of the cycle. In this way spatial nonuniformities due to charge build-up are avoided. Overall spatial variations can be further minimized by the use of mylar or optical fiber spacers between the two plates to maintain uniform cell thickness. Very fast switches and drive amplifiers are required to avoid problems caused by slewing delays as the polarity is reversed; suitable components for these functions include well-known broadband (100 kHz) servo amplifiers, coupled with low-resistance ($R_{on} < 100$ Ohm) field effect transistors (FET's) and gate drivers wired as double pole, double throw switches. Finally, the servo amplifiers must be designed to be stable when driving a purely capacitive load, as the liquid crystal cell presents a load of up to a few microfarads of capacitance.

In order to make these devices suitable for precision use, the retardance must be measured and controlled, such operation being performed, for example, by one of several suitable techniques as described below. In accordance with a first novel technique, a relatively monochromatic source of polarized light may be introduced through the cell and the polarization shift of the cell measured, using a polarizer and light detector.

As shown in FIG. 5, a retardance sensor 30 is positioned at a selected region of a liquid crystal cell 31 of the type discussed above. A source of light is provided in the form of a light emitting diode 32 which when supplied with an appropriate fixed voltage from a source 33 produces an output light having relatively monochromatic characteristics, i.e., light within a relatively narrow range of frequencies. An LED of the type sold under Model description CEN2010 from Centonic Corp. of Newbury Park. Calif. can be used.

The light therefrom is supplied to the selected region of cell 31 via a polarizing element 34, e.g., a dichroic sheet polarizer as obtainable from Polaroid Corporation of Cambridge, Mass. The axis of polarization of polarizer 34 is at a selected angle with respect to the alignment layer axis of the liquid crystal device, such angle preferably selected to be 45°. The light passing through the selected region of cell 31 will be subjected to retardance depending on the driven state of the liquid crystal directors as controlled by A-C carrier modulated source 39, as discussed above.

The light through cell 31 is thereupon supplied to a photodetector 35 via a sheet polarizer 36. Polarizer 36 selectively transmits the light therethrough, the axis of polarization being at a specified angle with respect to that of the polarizer 34. Preferably such specified angle is selected such that polarizers 34 and 36 have essentially parallel axes of polarization or essentially perpendicular axes of polarization, as selected by a designer for a particular application. In the case of parallel axes, for example, light will be transmitted therethrough without loss when the retardance is zero and will not be transmitted at all when the retardance is equal to one-half the wavelength of the light being transmitted. In the case of perpendicular axes such relationships will be reversed, as would be clear to the art. The current through photodetector 35 is converted to a voltage signal by current to voltage amplifier 37. The voltage output from amplifier 37 thereupon provides a representation of the intensity of the light which has passed through cell 31 from LED 32.

The retardance can then be calculated, via a retardance, R, calculator 55, in accordance with the expression $$R = \frac{L}{\pi} \cdot \arccos \sqrt{I/I_o}$$

as discussed below. The output from retardance calculator 55 thereupon represents the retardance of cell 31. Such calculation can be implemented by a microprocessor, for example, as would be well known to those in the art, or in any other convenient manner selected by the art.

When the source 39 produces a fully driven state for cell 31, essentially all of the directors are aligned with the electric field across the cell and effectively all of the light from LED 32 is transmitted through cell 31 (i.e., the retardance is zero) and a maximum voltage is produced at amplifier 37. Such condition provides a suitable calibration reference voltage representing $I_o$.

As the electric field is changed by varying the modulation level of source 39, the retardance produced by the cell varies and the voltage output from amplifier 37 represents the changing retardance characteristic of cell 31. If a substantially constant retardance characteristic is desired the output voltage from amplifier 37 can be compared at servo control amplifier circuit 38 with a reference voltage which represents a desired (e.g., constant) retardance. If such voltage are different, a control signal from control amplifier 38 is provided to source 39 to vary the modulation characteristics of the A-C carrier modulated signal in a manner such as to effectively reduce such voltage difference at control amplifier 38 to zero, in accordance with well-known feedback control techniques.

Thus, the retardance characteristics of the cell 31 can be maintained substantially uniform in a controlled manner using the feedback control system of FIG. 5 with the above described cell structure in accordance with the invention. As mentioned above in this connection, the retardance is determined by the expression.

$$R = \frac{L}{\pi} \cdot \arccos \sqrt{(I/I_o)}$$

where L is the wavelength of light, I is the intensity of the exiting light, and $I_o$ is the light intensity when the cell is removed (effectively the calibration condition equivalent to when the cell is driven to essentially zero retardance). When such a measurement and control system, as in FIG. 5, is included directly, i.e., integrally packaged with the cell structure in an overall cell construction, for example, the resultant system is self-calibrating. This technique allows precision tunable waveplates, whose retardance is rapidly variable under electrical control, to be made.

In the technique shown in FIG. 5, as the modulation level of the carrier modulated signal from source 39 is decreased, the retardance characteristic of cell 31 is increased and the intensity of the input polarized light passing through cell 31 is decreased. If the modulation level is decreased beyond a certain level at which the input polarized light is rotated 90° by the cell 31, i.e., the amount of light through cell 31 at such polarization is zero, any further decrease in modulation level causes said light to rotate beyond 90° which in turn causes the output light through cell 31 to increase. Thus, the expression for R is multi-valued, i.e., retardances which differ by the wavelength of the light L are indistinguishable, and there is a mirror symmetry about the half-wave point L/2. Thus, unless the retardance is known to lie between 0<R<L/2 (or within any similar interval offset by L/2), the absolute retardance is unknown.

Figure 6B:
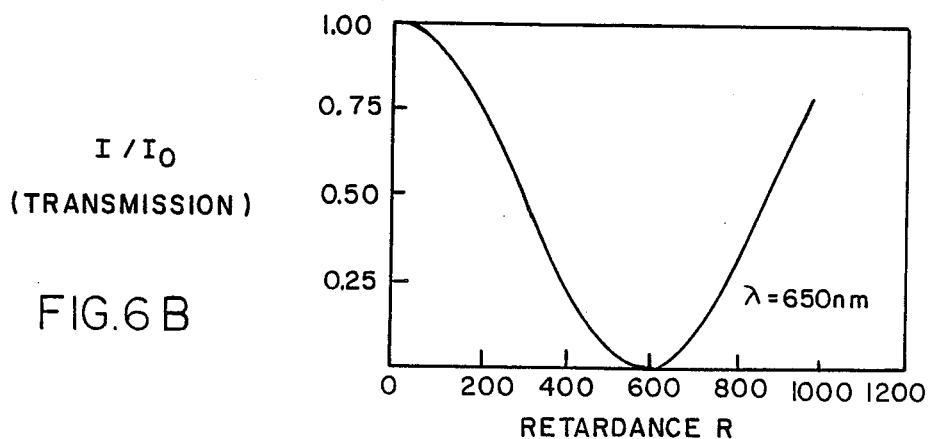

To extend the usefulness of the device beyond L/2, several monochromatic sources with substantially different wavelengths can be used. FIGS. 6A and 6B show the functions $I/I_0$ (transmission) plotted for two sources, e.g., at wavelengths of 510 nm. and 650 nm. (effective results can be achieved, for example, by selecting wavelengths at exemplary values having a ratio of about 1.25:1 or so), as the absolute retardance R is varied from 0 to 1000 nm. Because of the differences in the periods of these two functions at two different wavelengths, no two values of R have the same $I/I_0$ for both light sources. By simultaneous measurements of $I/I_0$ with polarized light sources at such two wavelengths one can determine the absolute retardance R of the liquid crystal cell up to values beyond the wavelength of any of the individual sources.

The retardance of the cell can be so determined, for example, by the following scheme. For each source 32A or 32B, providing light at different wavelengths, the retardance, R, can be predetermined as a function of intensities (i.e., as a function of $I/I_o$) by using the retardance equation set forth above. Accordingly, a predetermined list is made of a plurality of possible values of R, including all R values which are due to the symmetries in L and L/2 for a plurality of light sources at different wavelengths. The lists, that is, the predetermined R values determined for each of the different sources, can then be pre-stored, as, for example, in a suitable storage device such as a look-up table. Measurements of $I/I_o$ at each wavelength, as discussed above, are then made and used to enter the look-up table and to compare the R values therein at such $I/I_o$ measurements at each wavelength (normally, except for $I/I_o=0$, the R value will be double-valued as can be seen from the curves of FIGS. 6A and 6B). The lowest value of R from the look-up table for which such values are the same for each source is then selected to be the retardance value R of the cell 31.

A servo control feedback system similar to that shown in FIG. 5 then allows precise control the cell retardance in spite of device-to-device variations, nonlinearities, temperature variations, and aging effects.

Figure 8:
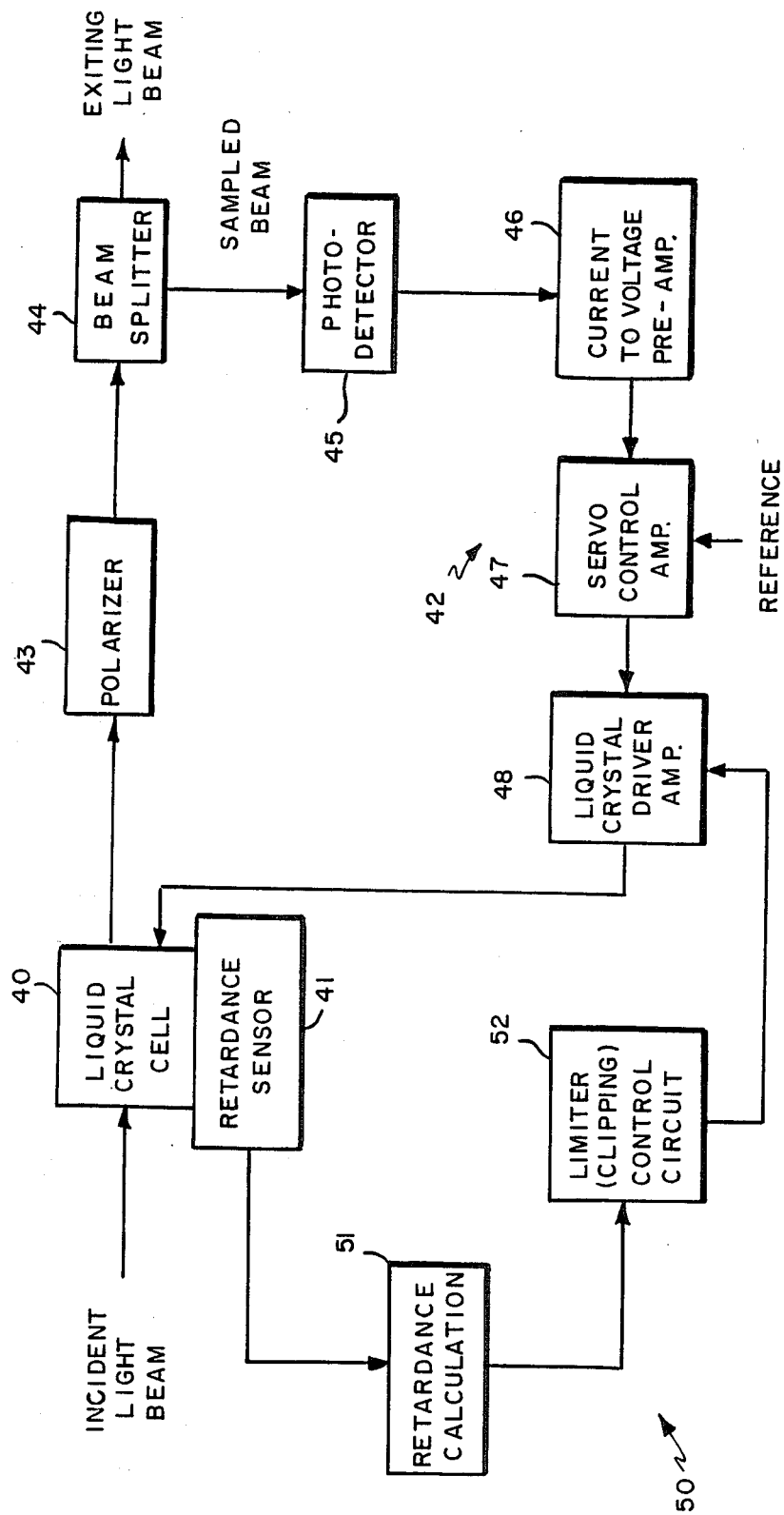
FIG. 8 shows a block diagram of an alternative embodiment of a system in accordance with the invention.

As to the use of liquid crystal cells discussed above in a system for controlling a light source, one such system is depicted in the feedback system depicted in the block diagram of FIG. 8 in which a liquid crystal cell 40 having a retardance sensor 41 effects a variable retardance upon incident light having a fixed linear polarization and variable amplitude. The intensity of the exiting light varies in accordance with the variations in input amplitude, while the exiting polarization varies in accordance with the cell retardance characteristics.

When the exiting beam is then passed through a fixed linear polarization 43, only a fraction of the incident intensity will be transmitted through the polarizer. The fraction will depend upon the retardance of the cell and the angle between the polarization axis of the incident light and the axis of the fixed linear polarizer. In this way, the cell and fixed polarizer form a variable attenuator. Light exiting the polarizer will have fixed linear polarization, and an intensity given by the product of the incident intensity and the transmission of the cell and polarizer combination.

A portion of the output light beam is supplied to a feedback control system 42 for providing a controlled amplitude and a linear polarization despite varying input power, and with low sensitivity to the cell characteristics. In accordance therewith the output light from the cell and polarizer 43 is supplied to a beam splitter 44 which provides both the usable light beam exiting from the system and a smaller sample thereof for the feedback system. The sampled beam is detected by a photodetector 45 which supplies a current proportional to the intensity thereof. The current output is supplied to a current to voltage converter pre-amplifier 46, the voltage output of which represents the light intensity and is supplied to a servo amplifier 47 and thence to the driver circuit 48 of the liquid crystal cell. In order to maintain the intensity of the exiting output beam at a desired selected intensity level, the sampled beam voltage is compared to a selected reference voltage level, representing the desired intensity level at servo amplifier 47 in accordance with well known servo amplifier principles. Thus, the intensity of the output beam can be maintained at a desired level (depending on such reference level) even though variations in the light beam may occur, due to compensating variations in the cell characteristics.

Further, if cells having different characteristics are used in different systems, the intensity of the output beams from such systems can be maintained at the same desired reference level by so varying the cell characteristics via variations in voltage supplied from the liquid crystal cell driver circuits of each system. Thus, uniformity of operation can be assured from system to system.

Such a system produces a linear control of the intensity of transmitted light through the cell and compensates for the $\cos^2$ intensity vs. retardance characteristics which the polarizer imposes as well as for the non-linear retardance vs. drive voltage characteristics of the cell. Such operation allows for the use of cells for direct intensity control of monochromatic, or substantially monochromatic, light and is well suited to control or measure laser light sources, even if used without the retardance control circuit 50 shown in FIG. 8 and discussed below.

Such systems can be further improved to avoid "latch-up" due to unintended positive feedback by appropriately constraining the drive voltage supplied to cell 40 from driver circuit 48. Such operation is performed by a retardance control circuit 50 in which the retardance of cell 40 is contrained to lie within a single region, e.g., [nL, (n+½)L] or [(n+½)L, (n+1)L], where n is an integer (which may be 0) and L is defined, as above, as the wavelength of an input light beam.

Figure 7:
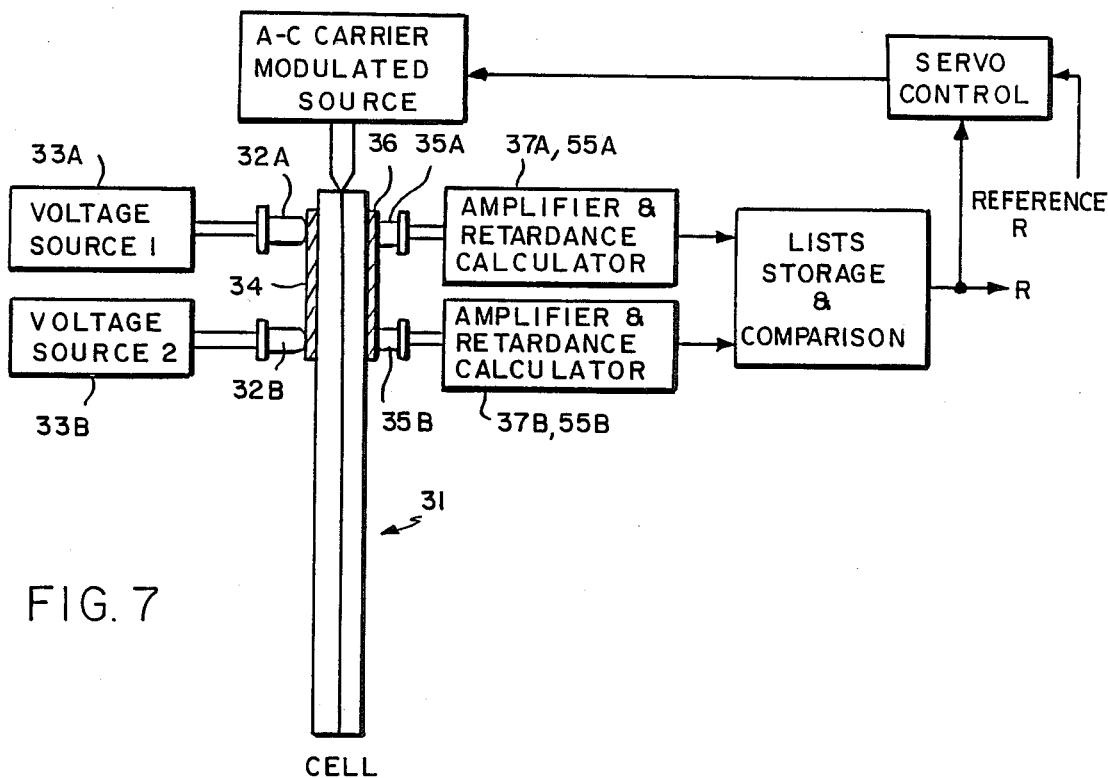
FIG. 7 shows a block diagram of an alternative embodiment of a system for determining the retardance thereof.

Thus the retardance is calculated by a retardance calculation circuit 51 (using the aforesaid expression therefor and a suitable technique for implementing such calculation as described above with reference to FIGS. 5 and 7) in response to the retardance sensor 41. The retardance value is supplied to a limiter (or clipping) control circuit 52. The limiter circuit is set to provide output control values as determined by the values needed to retain the retardance within the desired single region of interest specified above. Such output control signal prevents the driver circuit 48 from driving the cell beyond such constraint limits and avoids the aforesaid latch-up problems. The implementation of the limiter control circuit 52 and its use in controlling driver amplifier 48 would be well known to those in the art. Accordingly, the drive voltage can be constrained to always lie within a specified range on the basis of a measurement of the cell retardance so as to provide a relatively fast dynamic response to changes in retardance.

Retardance devices in accordance with the invention are also useful in forming birefringent bandpass filters. It is common practice to fabricate such filters (sometimes called "Lyot filters") using several waveplates in concert with polarizers. A technique therefor is described in the article by Solc, Ivan, Journal of the Optical Society of America, 55, 621 (1965). An alternative implementation is described in the article by Title, A. M., Applied Optics, 15, 2871 (1976). These filters can be tuned dynamically to vary the center (or bandpass) wavelength, if precisely tunable waveplates are available. Attempts to fabricate such waveplates using liquid crystal devices have been unsuccessful due to the difficulty in making liquid crystal retardance devices which are capable of being adequately matched and tunable. No other types of tunable waveplates are yet available.

In the absence of such tunable waveplates, it is possible to realize tunable filters by using substantially achromatic waveplates. In such an approach, the orientation of the waveplate axes is mechanically rotated in a controlled manmner in order to tune the center wavelength. However, this structure introduces design and fabrication difficulties because of the need for achromatic waveplates, and the tuning speed is limited by the mechanical means used to rotate the waveplates.

The present liquid crystal cells of the invention using retardance sensing and servo control integrally packaged with cell structure itself permits such devices to be used as tunable waveplates to provide tunable Lyot filters. The simplicity of the design thereof and the speed of tuning which can be achieved electronically provide key improvements over presently proposed techniques, as well as ease of fabrication. The latter advantage derives from the decreased accuracy which is required in fabricating the retardance cells. Increased manufacturing tolerances can be allowed and can be compensated for during use by the use of the retardance servo control circuitry. So long as the cells have adequate uniformity across their active regions, they can be readily used as tunable waveplates for the desired filter operation.

Figure 9:
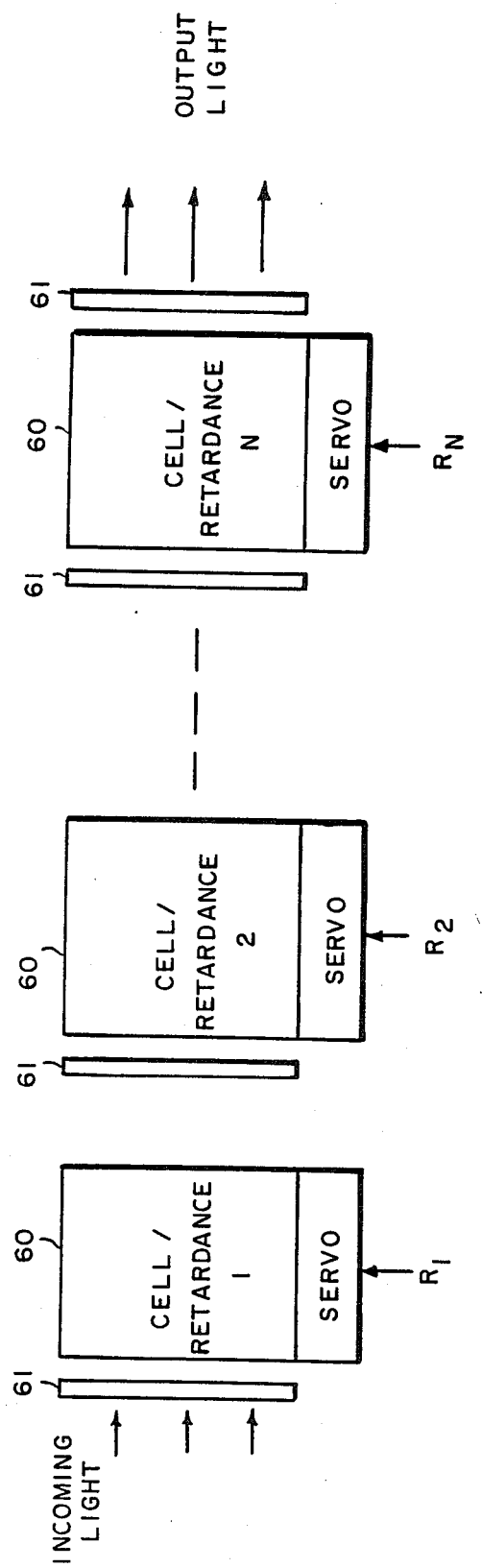
FIG. 9 shows a block diagram of one embodiment of a birefringent filter system which makes use of the invention.

An embodiment of a birefringent filter system is depicted in FIG. 9. Such a filter comprises one or more retardance measurement devices 60 which are effectively positioned in series so as to respond to incoming light. Each retardance device comprises an integrally formed retardance device, a liquid crystal cell, a fixed voltage source, and a servo control amplifier circuit as discussed above with reference to FIG. 5, for example. The retardance of each device is selected in accordance with a reference value set to produce the desired retardances at each position throughout the filter, e.g., retardances $R_1, R_2, \ldots R_n$. Such retardance values are selected by a user to realize a desired spectral transmission characteristic, generally in the nature of a narrow bandpass type filter. The retardance devices are positioned between linear polarizers 61. If there are n retardances the system would use n+1 such polarizers as shown, where $\geq 1$.

The configuration of FIG. 9 permits a simple realization of a birefringement, or Lyot, filter while at the same time permitting the filter characteristics to be easily changed during use by merely changing the reference values $R_1, R_2, \ldots R_n$.

While the above discussed embodiments represent preferred embodiments of the invention, modifications thereto and other uses thereof may occur to those in the art within the spirit and scope of the invention. Hence, the invention is not to be construed as limited only to the embodiments described above, except as defined by the appended claims.

What is claimed is:

1. A system for measuring the retardance of a liquid crystal device, said system including a liquid crystal device having a selected alignment layer axis;

at least one retardance sensor positioned at a selected region of said liquid crystal device, said retardance sensor comprising a source of light for producing a light beam having a fixed intensity and a selected wave length or a range of wavelengths;

first polarizing means having an axis of polarization which is at a selected angle with respect to the alignment layer axis of said liquid crystal device and being responsive to said light beam for supplying a first polarized light beam for transmission through said liquid crystal device;

second polarizing means having an axis of polarization at a selected angle with respect to the axis of polarization of said first polarizing means and responsive to said transmitted polarized light beam for selectively transmitting said light beam; and means for detecting the intensity of said selectively transmitted light beam; and means responsive to the detected intensity for providing an output representing the retardance of said liquid crystal device.

2. A system in accordance with claim 1 wherein said liquid crystal device is a device in which the alignment of the liquid crystal molecule directors therein is substantially free of twist, said device including means for establishing an electric field across the liquid crystal material therein.

3. A system in accordance with claim 2 wherein the axis of polarization of said first polarizing means is at a 45° angle with respect to said alignment layer axis and said first and second polarizing means have essentially parallel axes of polarization.

4. A system in accordance with claim 2 wherein the axis of polarization of said first polarizing means is at a 45° angle with respect to said alignment layer axis and said first and second polarizing means have essentially perpendicular axis of polarization.

5. A system in accordance with claim 2 and further wherein said electric field establishing means includes means for applying an AC carrier modulated signal to said liquid crystal material, the modulation level of which controls the state of said liquid crystal molecule directors in a continuous manner over a range from a selected partially driven state to a fully driven state; and further including control means responsive to said output representing the retardance of said liquid crystal device and to a reference input for producing a control signal; and said AC carrier modulated signal applying means is responsive to said control signal for changing the modulation level of said AC carrier modulated signal so as to change the retardance of said liquid crystal device in a manner such as to minimize the difference between said retardance output and said reference input.

6. An instrument for measuring the retardance of a liquid crystal device having a selected alignment layer axis comprising at least first and second systems for measuring the retardance of a liquid crystal device, said first system including at least one retardance sensor positioned at a first selected region of said liquid crystal device, said retardance sensor comprising a first source of light for producing a light beam having a fixed intensity and a first selected wavelength;

first polarizing means having an axis of polarization which is at a selected angle with respect to the alignment layer axis of said liquid crystal device and being responsive to said light beam for supplying a first polarized light beam for transmission through said liquid crystal device;

second polarizing means having an axis of polarization at a selected angle with respect to the axis of polarization of said first polarizing means and responsive to said transmitted first polarized light beam for selectively transmitting said first polarized light beam; and means for detecting the intensity of said selectively transmitted first polarized light beam;

said second system including at least one retardance sensor positioned at a second selected region of said liquid crystal device, said retardance sensor comprising a second source of light for producing a light beam having a fixed intensity and a second selected wavelength, first polarizing means having an axis of polarization which is at a selected angle with respect to the alignment layer axis of said liquid crystal device and being responsive to said second light beam for supplying a second polarized light beam for transmission through said liquid crystal device;

second polarizing means having an axis of polarization at a selected angle with respect to the axis of polarization of said first polarizing means and responsive to said transmitted second polarized light beam for selectively transmitting said second polarized light beam; and means for detecting the intensity of said selectively transmitted second polarized light beam;

means for storing predetermined values of retardance as a function of a plurality of selected light intensities at a plurality of wavelengths of light, including at least said first and second wavelengths;

means responsive to the intensities detected by said at least first and second systems at said at least first and second wavelengths and for comparing the predetermined values of the retardances at said intensities in said storage means and for selecting as the retardance of said liquid crystal device the lowest value of retardance for which such values are the same at said at least first and second wavelengths.

7. An instrument in accordance with claim 6 wherein said storing means is a look-up table.

8. A system for controlling the intensity of a polarized light beam, said system including
a liquid crystal device having a selected alignment layer axis and wherein the alignment of the liquid crystal molecule directors therein is substantially free of twist, said device including means for establishing an electric field across the liquid crystal material therein;
a polarizing means responsive to the light beam transmitted through said liquid crystal device for providing a polarized output light beam therefrom;
beam splitting means for providing a first substantial output portion of said polarized light beam and a second sample portion of said polarized light beam;
means for detecting the intensity of said sample portion of said polarized light beam to produce a sampled output representative of said intensity;
control means responsive to said sampled output and to a reference intensity value and for providing a first control signal as a function of the difference therebetween;
means for establishing an electric field across the liquid crystal material of said liquid crystal device, said means being responsive to said first control signal for changing the retardance of said liquid crystal device so as to minimize said difference whereby the intensity of said output portion of said polarized light beam is maintained at a stable level represented by said reference intensity value 9. An instrument in accordance with claim 8 wherein said liquid crystal device is a device in which the alignment of the liquid crystal molecule directors therein is substantially free of twist and said electric field establishing means is an AC carrier modulated signal applying means.

10. A system in accordance with claim 9 and further including
a retardance sensing means positioned at a selected region of said liquid crystal device for determining the retardance of said liquid crystal device;
limiter means responsive to said retardance for providing a second limiter control signal which is limited to levels within a selected range;
said AC carrier modulated signal applying means being further responsive to said second limiter control signal for restricting the retardance of said liquid crystal device to lie within a selected range.

11. A birefringent filter responsive to incoming light and comprising
one or more systems for measuring the retardance of a liquid crystal device,, each said system being positioned in series with and responsive to said incoming light and including
a liquid crystal device having a selected alignment layer axis and in which the alignment of the liquid crystal molecule directors therein is substantially free of twist, said device including means for establishing an electric field across the liquid crystal material therein;
said electric field establishing means includes means for applying an AC carrier modulated signal to said liquid crystal material, the modulation level of which controls the state of said directors in a continuous manner over a range from a selected partially driven state to a fully driven state;
at least one retardance sensor positioned at a selected region of said liquid crystal device, said retardance sensor comprising
a source of light for producing a light beam having a fixed intensity and a selected wavelength or a range of wavelengths;
first polarizing means having an axis of polarization which is at a selected angle with respect to the alignment layer axis of said liquid crystal device and being responsive to said light beam for supplying a first polarized light beam for transmission through said liquid crystal device;
second polarizing means having an axis of polarization at a selected angle with respect to the axis of polarization of said first polarizing means and responsive to said transmitted polarized light beam for selectively transmitting said light beam;
means for detecting the intensity of said selectively transmitted light beam and for providing an output representing the retardance of said liquid crystal device;
control means responsive to said output representing the retardance of said liquid crystal device and to a reference input for producing a control signal;
said AC carrier modulated signal applying means being responsive to said control signal for changing the modulation level of said AC carrier modulated signal so as to change the retardance of said liquid crystal device in a manner such as to minimize the difference between said retardance output and said reference input;
two or more polarizer means alternatingly positioned in series with said one or more systems;
the reference
input of each of said systems being selected for controlling the spectral transmission characteristics of said filter.

12. A birefringent filter in accordance with claim 11 wherein said filter includes n said systems and (n+1) said polarizer means.

* * * * *